J. Erdle,

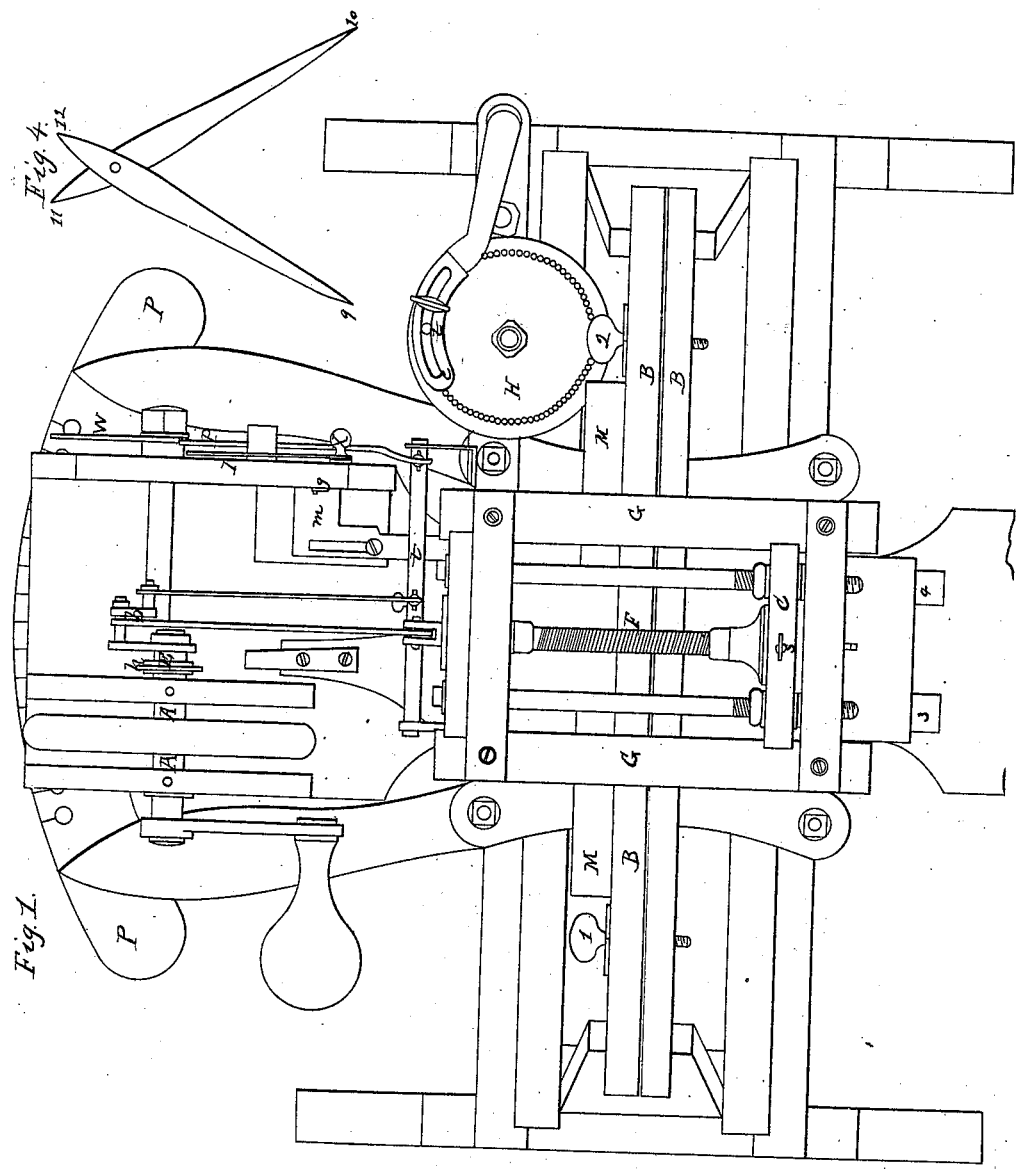

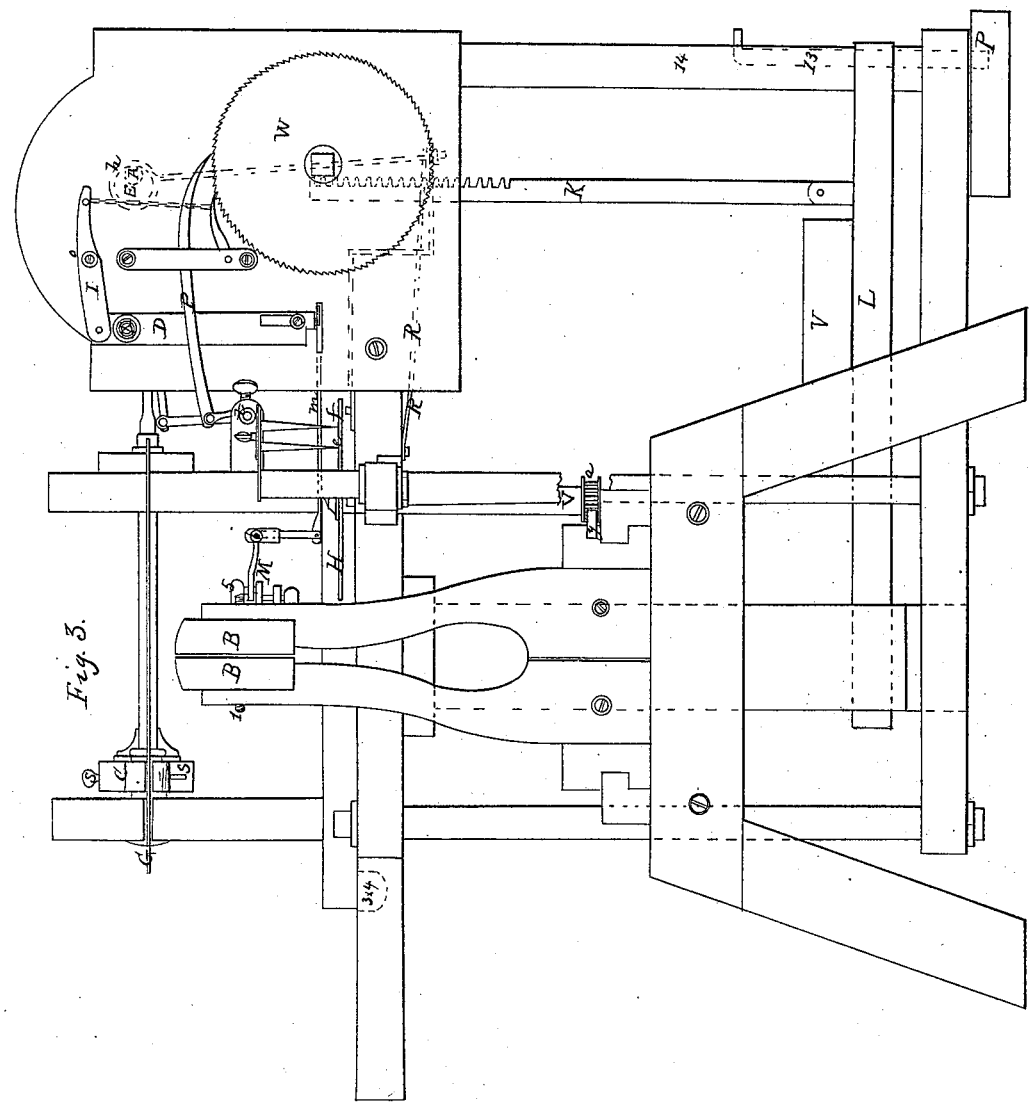

Sharpening Reciprocating Saws.

N°14,055.  Patented Jan. 8, 1856.

UNITED STATES PATENT OFFICE.

JACOB ERDLE, OF WEST BLOOMFIELD, NEW YORK.

FILING SAWS.

Specification of Letters Patent No. 14,055, dated January 8, 1856.

*To all whom it may concern:*

Be it known that I, JACOB ERDLE, of West Bloomfield, in the county of Ontario and State of New York, have invented certain new and useful Improvements in Machines for Filing Saws, of which the following is a full and accurate description, reference being had to the accompanying drawings, making part of this specification, in which—

Figure 5:
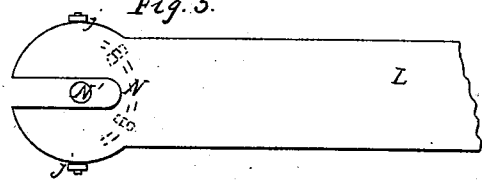
Figure 2:
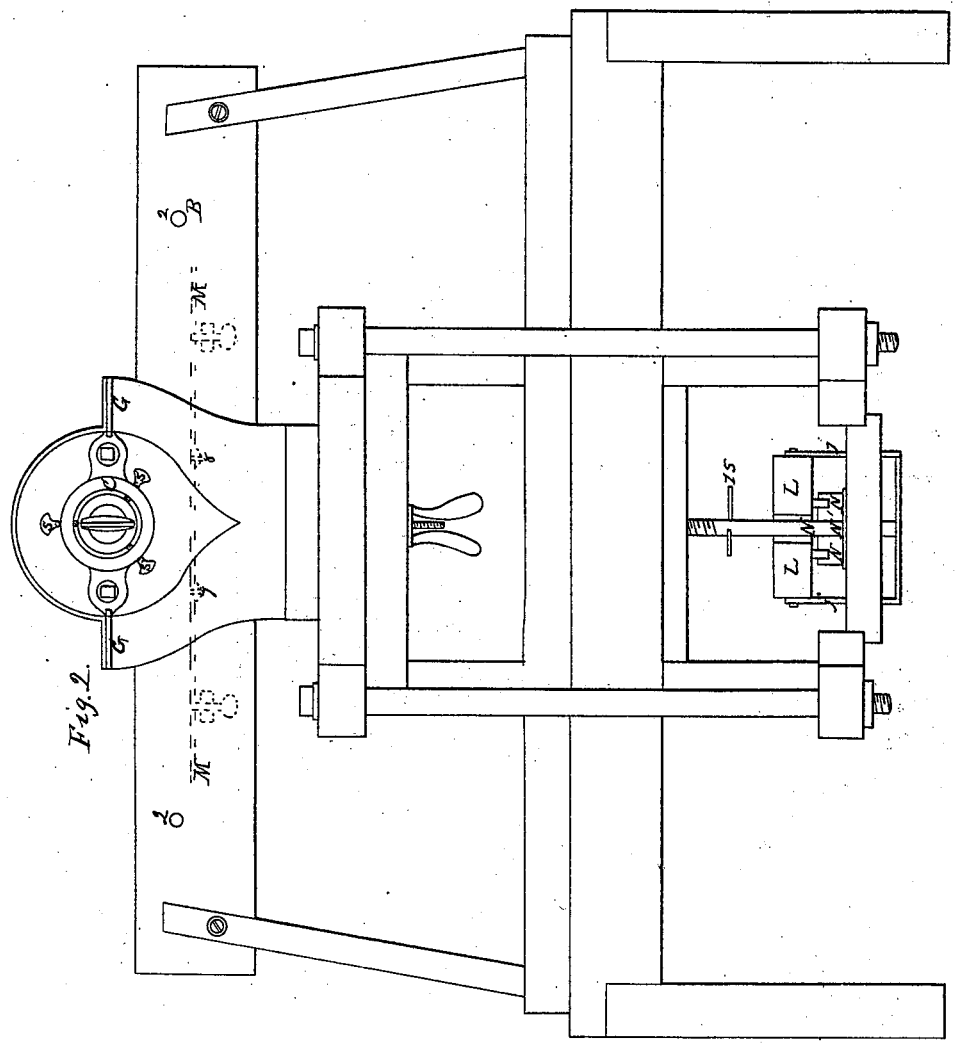

Figure 1 is a plan of the machine. Fig. 2 is an end elevation. Fig. 3 is a side elevation. Figs. 4 and 5 are details of the machine hereafter referred to.

The nature of this invention consists in certain devices and arrangements whereby the operation of filing the teeth of a saw, may be much more perfectly and expeditiously performed than it could be by any means heretofore known.

To enable others skilled in the art to make and use my invention, I will describe its construction and operation, which may best be done by detailing the steps of the operation for filing one tooth, and likewise for bringing the next tooth forward as well as the several points of adjustment in the machine to adapt it to varying kinds of work.

The file F having been placed in its proper position, and adjusted so as to move in the plane of the guides G G by means of the adjusting screws S, S, S, working in the periphery of the chuck C the saw is fixed between the clamps B by means of the screws 1 and 2. It will then be evident that on operating the crank so as to slide the file back and forward, it will cut down the tooth to any required depth. In order to do this properly however, two things are absolutely requisite—first, that the file be raised from the saw during its backward motion, so as not to wear it out unnecessarily and, second, that the file and saw be made to approach each other a proper distance at each stroke of the file, and when a proper depth has been obtained, that the file be raised from the saw so as never to cut it too deep in any one place. The first of these objects is attained by means of the eccentric E keyed on the crank shaft A and operating by the eccentric hoop $h$ to elevate the file frame on the return motion of the file, which is accomplished by keying the eccentric so that its throw shall be at right angles to the crank. The eccentric rod passes below the frame in which the crank shaft, &c., are fixed, and is connected to the file frame by the bar screwed thereon. The file frame is hinged to the bed on which it rests at the points 3 and 4 and after being raised by the action of the eccentric, is lowered for the forward stroke by means of a spring (R) or its own weight if that be found sufficient. The action of the eccentric and its connection with the file frame is shown in red lines in Fig. 3.

In order to feed the file into the saw, or the saw up to the file, I connect the rock shaft $t$ with the crank shaft by means of the secondary crank $b$ and its connections. This operates the pawl P and ratchet wheel $w$ in a well known manner. The rag wheel is keyed on a shaft carrying a pinion which works in the rack R which rack depresses the frame in which the file is fixed, by means of the lever L working on the center N which consists of a semicircular plate, as shown in Figs. 2 and 5, the file frame being elevated through the links $j\ j$ and center rod N. In order to cause this feed action to cease when the desired depth of tooth has been obtained, I adopt the following mechanism.

D, Fig. 3, is a slide operating the lever I which moves on the pivot $o$. When the slide falls it is evident that it will raise the pawls out of gear, said pawls being connected to the elevated end of the lever by means of the chain shown in the drawing. If this slide be raised by the knob X the bar $m$ will slide forward toward the rag wheel being impelled by the spring $g$ Fig. 1 and will support the said slide. The pawls will then fall into gear, and on motion being imparted to the machine, the ratchet wheel W will slowly revolve, elevating the rack K and through it, depressing the file frame. When however the point of the set screw 5 attached to the rock shaft 6 reaches the bar M it will be pressed up, rotate the rock shaft and consequently withdraw the bar $m$ from beneath the slide D, which will then fall, the pawls will be raised out of gear, and the ratchet wheel being at liberty, the weight U will slowly elevate the file frame and its connections to the highest point. The bar M is adjustable by means of set screws as shown in dotted lines (Fig. 2) so that by the action of these screws and the holding pins (7) (8) it may be either made perfectly straight throughout its entire length (which, as will be at once seen, will give a straight edge to the saw,) or it may be curved, as desired.

Means having thus been found to file the tooth, relieve the file from any rubbing during its backward motion, and to stop the action of the file at the desired point, it only remains now to find a method of advancing the saw through a space sufficient for one tooth or two, if every second one be operated upon, as hereinafter described.

Attached to the saw-frame is the rack $y$ operated by the pinion Q on the shaft V to which is attached the divided plate H. All that is requisite therefore, is to rotate this divided plate the required amount, and the thing requisite is done. To do this, I construct the double ended compasses (Fig. 4) of which the proportion is such, that a portion of a revolution of the dividing plate equal to the space 9—10 will advance the saw through a space equal to the distance of the opposite points (11—12), setting the points 11, 12 then to a distance equal to the required size of the tooth. I set the points $e\ f$ at a distance apart equal to the space 9—10 between the opposite points of the dividers. It is now easy by means of a steel point or awl, to rotate the divided plate through a space equal to the distance of the points from each other, by simply inserting it in the hole nearest one of the points and moving it into contact with the other one. The saw will then of course be advanced the required distance.

Such are the main features of the operation, but to suit varying circumstances, the following adjustments are requisite: When it is desired to file the teeth of a saw not square across the saw, but at an angle, the whole file frame and crank shaft with its frame are rotated about the center N' and held in position with regard to the graduated curve P P by means of the rod 13 which slides in the vertical post 14. Then in filing the saw, we omit every second tooth, and afterward file the omitted teeth, having previously turned the file frame in a contrary direction to the same angle that we at first used. The screw N' and bar 15 Fig. 2 which are exactly in the center just mentioned, serve to elevate the saw frame to the file to adjust the machine for large or small saws. The circular plate N Fig. 2, and shown separately in plan Fig. 5 serves as a species of universal joint whereby the horizontal rotation of the file frame does not interfere with the vertical movement required to feed the file toward the saw as previously described.

What I claim as my invention and desire to secure by Letters Patent are—

The use of the eccentric $e$ and the various parts coöperating therewith for raising the file as it recedes; the lever L, plate H, and their connections, for feeding the saw through one or more teeth and for regulating the depth of the cut and its angle, all arranged and constructed substantially as herein shown.

JACOB ERDLE. [L. S.]

Witnesses:
  JAS. H. HALL,
  ASA GILLETT.